United States Patent [19]

Ward et al.

[11] 3,818,461

[45] June 18, 1974

[54] BUFFER MEMORY SYSTEM

[75] Inventors: Raymond W. Ward, Northridge; Phillip W. Yows, Westlake Village, both of Calif.

[73] Assignee: Litton Systems Inc., Beverly Hills, Calif.

[22] Filed: Mar. 5, 1973

[21] Appl. No.: 336,641

Related U.S. Application Data

[63] Continuation-in-part of Ser. No. 242,525, April 10, 1972, Pat. No. 3,748,652.

[52] U.S. Cl. .............................................. 340/172.5

[51] Int. Cl. .............................................. G11c 9/00

[58] Field of Search ...................... 340/172.5, 173 R

[56] References Cited

UNITED STATES PATENTS

| | | | |
|---|---|---|---|
| 3,059,221 | 10/1962 | Page et al. | 340/172.5 |
| 3,302,180 | 1/1967 | Donohoe et al. | 340/172.5 |
| 3,369,223 | 2/1968 | Dryden | 340/172.5 |
| 3,648,247 | 3/1972 | Guzak, Jr. | 340/172.5 |

*Primary Examiner*—Raulfe B. Zache
*Assistant Examiner*—Michael Sachs

[57] ABSTRACT

A memory system having a memory for storing data messages from a digital computer and display means for reading data messages from the memory at a rate independent of writing data messages. A counter means counts the number of data messages written into the memory and the number of data messages read from the memory to determine the locations in the memory for writing and reading, respectively. A queue of data messages is stored in the memory whenever the writing rate exceeds the reading rate. Data messages in such a queue are read in the order written.

4 Claims, 5 Drawing Figures

Fig. 3

| WRITE SEQ | READ SEQ. | OPERATION | MEMORY POSITION | TIME | COUNTER 44 $Q_3$ | $Q_2$ | $Q_1$ | $Q_0$ | RI | WI | INHIBIT SIGNALS |
|---|---|---|---|---|---|---|---|---|---|---|---|
| | | RESET | | | 1 | 1 | 1 | 1 | 1 | 0 | READ INHIBIT |
| 1 | | WRITE MESSAGE | 1 | | 0 | 0 | 0 | 0 | 0 | 0 | |
| | 1 | READ MESSAGE | 1 | $t_0$ | 1 | 1 | 1 | 1 | 1 | | READ INHIBIT |
| 2 | | WRITE MESSAGE | 2 | | 0 | 0 | 0 | 0 | 0 | | ENABLE READ |
| | 2 | READ MESSAGE | 2 | $t_5$ | 1 | 1 | 1 | 1 | 1 | | READ INHIBIT |
| 3 | | WRITE MESSAGE | 3 | | 0 | 0 | 0 | 0 | 0 | | ENABLE READ |
| 4 | | WRITE MESSAGE | 4 | | 0 | 0 | 0 | 1 | | | |
| | 3 | READ MESSAGE | 3 | $t_{10}$ | 0 | 0 | 0 | 0 | | | |
| 5 | | WRITE MESSAGE | 5 | | 0 | 0 | 0 | 1 | | | |
| 6 | | WRITE MESSAGE | 6 | | 0 | 0 | 1 | 0 | | | |
| 7 | | WRITE MESSAGE | 7 | | 0 | 0 | 1 | 1 | | | |
| 8 | | WRITE MESSAGE | 8 | | 0 | 1 | 0 | 0 | | | |
| | 4 | READ MESSAGE | 4 | $t_{15}$ | 0 | 0 | 1 | 1 | | | |
| 9 | | WRITE MESSAGE | 1 | | 0 | 1 | 0 | 0 | | | |
| 10 | | WRITE MESSAGE | 2 | | 0 | 1 | 0 | 1 | | | |
| 11 | | WRITE MESSAGE | 3 | | 0 | 1 | 1 | 0 | | | |
| 12 | | WRITE MESSAGE | 4 | | 0 | 1 | 1 | 1 | | 1 | WRITE INHIBIT |
| | 5 | READ MESSAGE | 5 | $t_{20}$ | 0 | 1 | 1 | 0 | | 0 | ENABLE WRITE |
| | 6 | READ MESSAGE | 6 | $t_{25}$ | 0 | 1 | 0 | 1 | | | |
| | 7 | READ MESSAGE | 7 | $t_{30}$ | 0 | 1 | 0 | 0 | | | |
| | 8 | READ MESSAGE | 8 | $t_{35}$ | 0 | 0 | 1 | 1 | | | |
| | 9 | READ MESSAGE | 1 | $t_{40}$ | 0 | 0 | 1 | 0 | | | |
| | 10 | READ MESSAGE | 2 | $t_{45}$ | 0 | 0 | 0 | 1 | | | |
| | 11 | READ MESSAGE | 3 | $t_{50}$ | 0 | 0 | 0 | 0 | | | |
| | 12 | READ MESSAGE | 4 | $t_{55}$ | 1 | 1 | 1 | 1 | 1 | | READ INHIBIT |
| | | | | $t_{60}$ | | | | | | | |
| 13 | | WRITE MESSAGE | 5 | | 0 | 0 | 0 | 0 | 0 | | ENABLE READ |
| | 13 | READ MESSAGE | 5 | $t_{65}$ | 1 | 1 | 1 | 1 | 1 | | READ INHIBIT |

BUFFER MEMORY SYSTEM

CROSS-REFERENCE TO A RELATED APPLICATION

This application is a continuation-in-part application of copending application Ser. No. 242,525, filed Apr. 10, 1972, for "Display Buffer" by Raymond Ward and Phillip Yows, the sane inventors, now U.S. Pat. No. 3,748,652.

DESCRIPTION OF THE PRIOR ART

Information display systems comprising a common digital computer and a number of optical display devices for the display of message data to operators are known in the prior art. As these display systems become larger in the capacity of the memory of the common computer, in the data message load, and in the number of display consoles, logic circuitry in the display consoles for selecting data messages to be displayed becomes increasingly more complex and expensive.

Heretofore, consoles have been connected via common communications links to the common computer, each console containing display logic to determine whether a particular message is to be processed by the console. Such a configuration requires that the console operate at a rate which is at least the equivalent of the rate at which the computer is dissimulating data messages. In such large display systems having a common computer and multiple display consoles, the number of data messages presented at the output of the common computer normally far exceeds the number of information messages to be displayed at any one particular console. However, the operator of an individual console may conventionally select among the total number of data messages presented at the output of the common computer those particular data messages desired for display on an individual console. As a result, each console must assimilate data at the rate it is presented at the output of the common computer and select some of the data messages for display. Hence, such consoles have required expensive display generation logic circuitry which is compatible with and will operate at the rate data messages are received from the common computer. Such expensive logic circuitry has been required even though not all of the data messages are actually displayed on any one individual console.

SUMMARY OF THE INVENTION

The present invention overcomes the above and other disadvantages of buffer displays of the prior art by providing a plurality of buffer memory systems each of which, according to the basic concept of the invention, writes data messages in regions of a memory at a rate at which messages are received from a common computer and at successive locations determined by counting the number of data messages written into the memory and reads data messages from the memory at a rate independent of the rate of writing and from locations determined by counting the number of data messages read from the memory. More specifically, the memory systems of the invention each employ a means for counting the number of data messages written into and read from the memory and for storing information indicating the current status of the data messages and a circuit means responsive to the current information in the counter means for controlling the locations in which data messages are written in the memory, controlling the locations from which data messages are read from the memory and controlling the sequence of writing and reading data messages to and from the memory.

In its preferred form, the memory system comprises a random access memory, a means for writing data messages into the memory, a means for reading data messages from the memory, a counter means for counting the number of messages written into the memory and the number of messages read out of the memory, and a circuit means responsive to the information stored in the counter means. The circuit means determines the location for writing a data message into the memory in response to the count indicating the number of data messages previously written into the memory. The circuit means also determines the location from which a data message is read in response to the counter indiciating the number of data messages previously read from the memory. The rate of reading is independent from the rate of writing. If the rate of writing is greater than the rate of reading, the memory will accumulate and store data systems in a queue. During periods when the rate of reading becomes greater than the rate of writing, the memory subsystem will read the stored data in the same sequence in which it was written into the memory.

It is also a feature of the invention that the circuit means is responsive to the counts indicating the number of messages written and the number of messages read into and from the memory to inhibit writing into the memory whenever the memory becomes filled with data messages that have not been read and for inhibiting reading whenever data messages previously stored in the memory have all been read.

It is, therefore, an object of the invention to provide a memory system for storing data messages received from a computer and for displaying the data messages at a rate independent of the computer.

Another object of the invention is to provide a memory system which displays data messages in the sequence in which they were stored in the memory.

A further object of the invention is to provide a memory system which stores a queue of data messages whenever the rate of receiving and writing data messages in the memory system exceeds the rate of reading and displaying the data messages.

Still another object of the invention is to provide a memory system which inhibits the writing of data messages whenever its memory has been filled with data messages not yet displayed.

Yet another object of the invention is to provide a memory system which inhibits reading data messages from its memory whenever data messages previously written in its memory have all been read.

A still further object of the invention is to provide a memory system which determines the location for writing the data message by counting the number of data messages previously written in the memory.

Yet another object of the invention is to provide a memory system which determines the location in its memory from which a data message will be read by counting the number of data messages previously read from its memory.

An additional object of the invention is to provide a memory system which inhibits writing in its memory and reading from its memory by counting the relative difference between the number of data messages previously written into its memory and the number of data messages previously read from its memory.

BRIEF DESCRIPTION OF THE DRAWINGS

FIG. 3 illustrates an example of the operation of the memory system illustrated in FIG. 2;

DESCRIPTION OF ONE EMBODIMENT OF THE INVENTION

Figure 1:
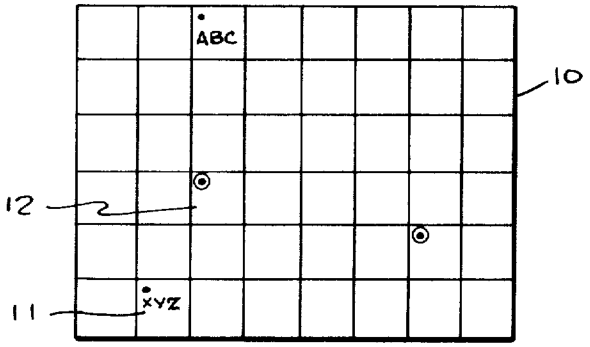
FIG. 1 is a representation illustrative of a set of data divided into sub-sets for display by individual console.

FIG. 1 illustrates a set 10 which is representative of a display screen illustrative of a region which may contain aircraft. The information to be displayed may relate to the identity, altitude, speed, heading and other pertinent data relating to such aircraft. Set 10 may be segmented into arbitrary sub-sets 11, 12, etc., where information is to be displayed relating to aircraft in a corresponding sub-region. The sub-sets and corresponding sub-regions may overlap so that several consoles will display the same data, or they may be mutually exclusive.

Figure 2:
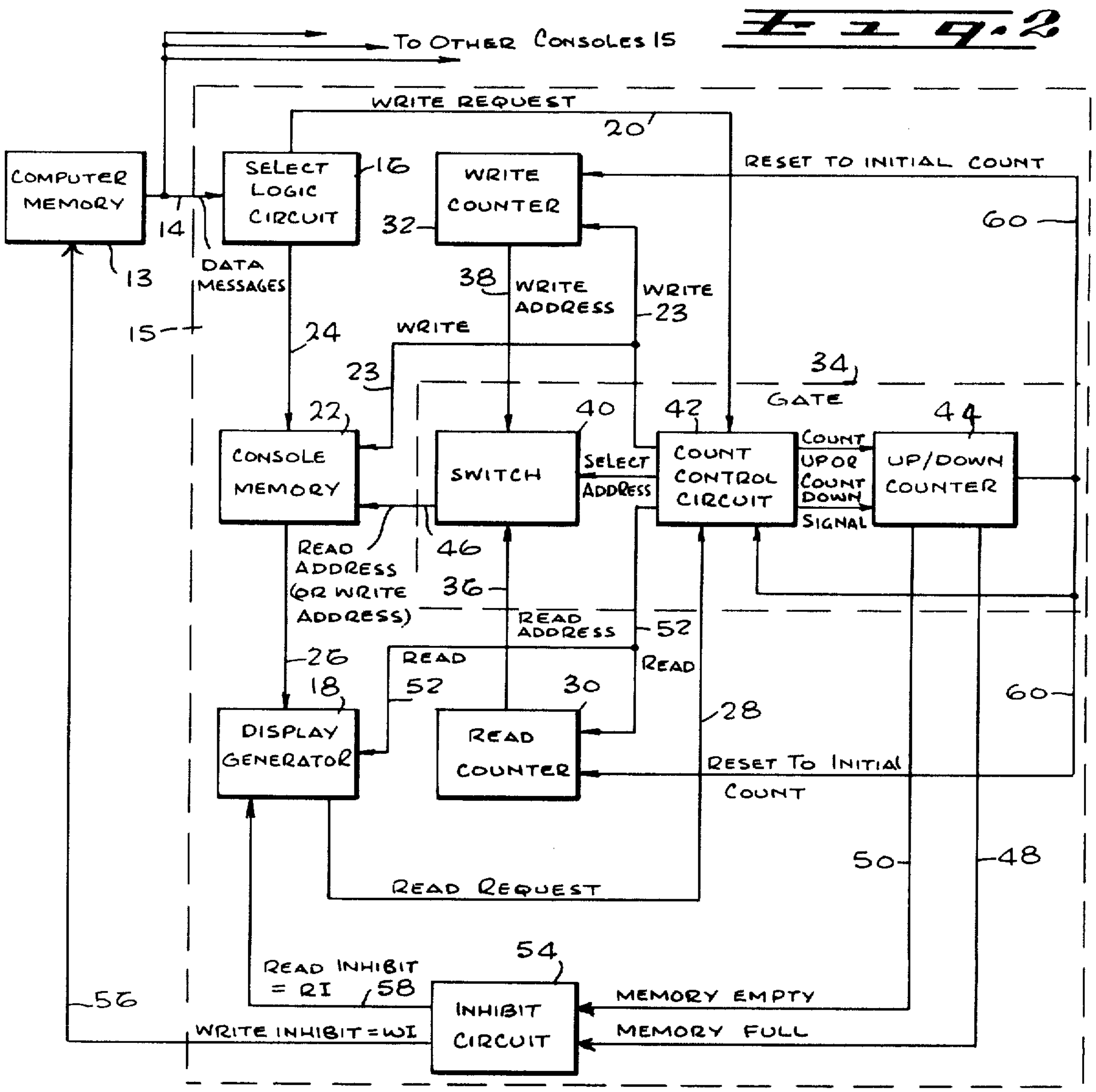
FIG. 2 is a block circuit diagram of a display buffer memory system illustrative of the principles of the invention, showing several memory systems connected to a common computer.

With reference to FIG. 2, the information or data to be displayed is stored as digital data messages in a computer memory 13 which is connected by common communications link 14 to a plurality of consoles 15. Each separately displayable item of data is programmed into the computer with an identifying select code associated with one of the sub-regions 11, 12, etc. For example, the select code may be dependent upon the locations of the particular aircraft. Computer memory 13 may be, for example, an 8,000 word by 32 bit random access core memory available from the Data Systems Division of Litton Industries, Inc., Van Nuys, California. Computer memory 13 refreshes the data messages presented to consoles 15 for display. For example, memory 13 may be completely read every 50 milliseconds.

Communications link 14 is connected to a select logic circuit 16 of each console 15. The select logic circuit 16 of each console 15 briefly stores each data message received from computer memory 13 and determines whether the message is intended for that particular console. Select logic 16 passes only those data messages intended for the particular console.

Select logic circuit 16, see U.S. Pat. No. 3,748,652, may comprise specially designed logic circuitry which enables the operator of a particular display console 15 to select among all of the data messages available on communications link 14 those data messages desired for display on a display generator 18 of a particular console. For example, a total of 512 separately displayable items of data may be programmed into computer memory 13. It may be desired to display a sub-set of up to any 256 of these items or data messages on any one console 15. Select logic circuit 16 would thus permit the operator of a particular display to select those data messages which are of immediate concern to his operational task.

Preferably, select logic 16 may comprise a high-speed, miniature digital computer having a specially written program to permit the selection of any sub-set of data messages from all the data messages available on communications link 14. If a computer is utilized for select logic 16, it must operate at a speed high enough to process the incoming data messages received from communications link 14. Select logic 16 generates a WRITE REQUEST signal on line 20 whenever it determines that data messages have been received from computer memory 13 which data messages have been selected according to a predetermined logic for display in its particular console 15.

Console memory 22 is connected to the output of select logic 16 to store those data messages received from computer memory 13 and selected by select logic 16. For purposes of the following explanation of the principles of the invention, it will be assumed that console memory 22 has a capacity of storing a total of eight data messages and that it is normally in a READ condition unless it receives a WRITE command on line 23. In a practical embodiment, console memory 22 may have a capacity of any desired number of words by any desired number of bits. For example, the memory may have a capacity of 1,024 words by 16 bits per word. The memory may be a memory similar to the console memory of U.S. Pat. No. 3,748,652 or may be made from a Model 93415 memory sub-system available from Fairchild Semiconductor, Mountain View, California. This series module is a 1,024 word by one-bit memory. A 1,024 word by 16 bit memory or a memories of other word lengths and bits/word may be constructed by connecting 16 of the modules in parallel and in a manner shown by information available from the manufacturer and known in the art.

Memory 22 may be any random access memory that can be operated on a first-in/first-out basis. Some examples are core memories and microcircuit memories such as MOS or bipolar memories.

Console memory 22 receives data messages on line 24 which is representative of connections to the memory data inputs. Data is written into console memory 22 in response to the WRITE REQUEST command from select logic 16 as discussed in detail below. Console memory 22 presents output data on data lines 26. Data messages are read from console memory 22 in response to a READ REQUEST command signal from display generator 18 as discussed below.

Display generator 18 may be any type of unit capable of displaying alphanumeric data messages received from memory 22. For example, a display generator 18 may be a display similar to the display of U.S. Pat. No. 3,748,652 or may comprise a cathode ray tube for visual display of data messages, deflection circuitry and other appropriate circuitry, all of which is available from the Data Systems Division of Litton Industries, Inc. Display generator 18 may also comprise a teletypewriter such as Model ASR-33-teletypewriter available from the Teletype Corporation, Skokie, Illinois.

Display generator 18 generates a READ REQUEST signal and transmits it on line 28. The READ REQUEST signal is generated at a rate independent of the rate at which data messages are being received by select logic 16. According to the principles of the invention, the rate at which data messages are displayed by display generator 18 will be significantly slower than the rate at which data messages are received by select logic 16. The timing of the READ REQUEST signal may be controlled by a clock (not shown) which is internal to display generator 18.

Read counter 30 counts the number of messages read from console memory 22. Similarly, write counter 32 counts the number of messages written into console memory 22. Read counter 30 and write counter 32 may each comprise a Series 8285 digital up/down counter available from the Signetics Company, Sunnyvale, California. Read counter 30 and write counter 32 each have a capacity to count at least up to the maximum number of words which may be stored in console memory 22. Where memory 22 has the capacity of eight words as discussed herein only one Series 8285 counter would be needed for the read counter 30 and one for the write counter 32. For a memory 22 having a larger capacity such as the example of 1,024 words discussed above, sufficient counters of the Series 8285 type would be connected in cascade to achieve the desired capacity, as is well known in the art. The counters may each be connected to count up or down from an initial predetermined number.

The current count of read counter 30 is a READ ADDRESS signal transmitted to gate 34 via line 36. The current count of write counter 32 is a WRITE ADDRESS signal transmitted to gate 34 via line 38.

Gate 34 controls the read and write addresses to memory 22 to control the location for storing data messages in said memory, to control the location from which data is read from said memory and to control the sequence of writing and reading data to and from memory 22. Gate 34 may comprise switch 40, count control circuit 42 and up/down counter 44.

Switch 40 of gate 34 provides to console memory 22 the WRITE ADDRESS where data messages incoming on line 24 are to be written and the READ ADDRESS from which data stored in the memory are to be read and presented on output line 26. Switch 40 provides the READ or WRITE ADDRESS by switching onto line 46 either the count stored in read counter 32 or the count stored in write counter 32 in response to a SELECT ADDRESS signal received by control circuit 42.

Switch 40 may be a Model 9322 multiplexer integrated circuit available from Advanced Micro Devices, Inc. of Sunnyvale, California. This multiplexer is the logic implementation of a 4-pole 2-position switch with the position of the switch set by logic levels supplied to the select inputs. For a memory having a capacity of eight words as discussed herein, only one such multiplexer device would be needed. Several of the multiplexer devices may be connected together in a well-known manner to achieve a capability for transmitting longer memory addresses, i.e. greater counts from counters 30 and 32.

Control circuit 42 of gate 34 generates a WRITE signal in response to a WRITE REQUEST signal and a READ signal in response to a READ REQUEST to further control the sequence of reading and writing data messages to and from memory 22. The WRITE signal operates memory 22 to write data present at its input at a location determined by the WRITE ADDRESS. The WRITE signal also changes the count of write counter 32.

Figure 4:
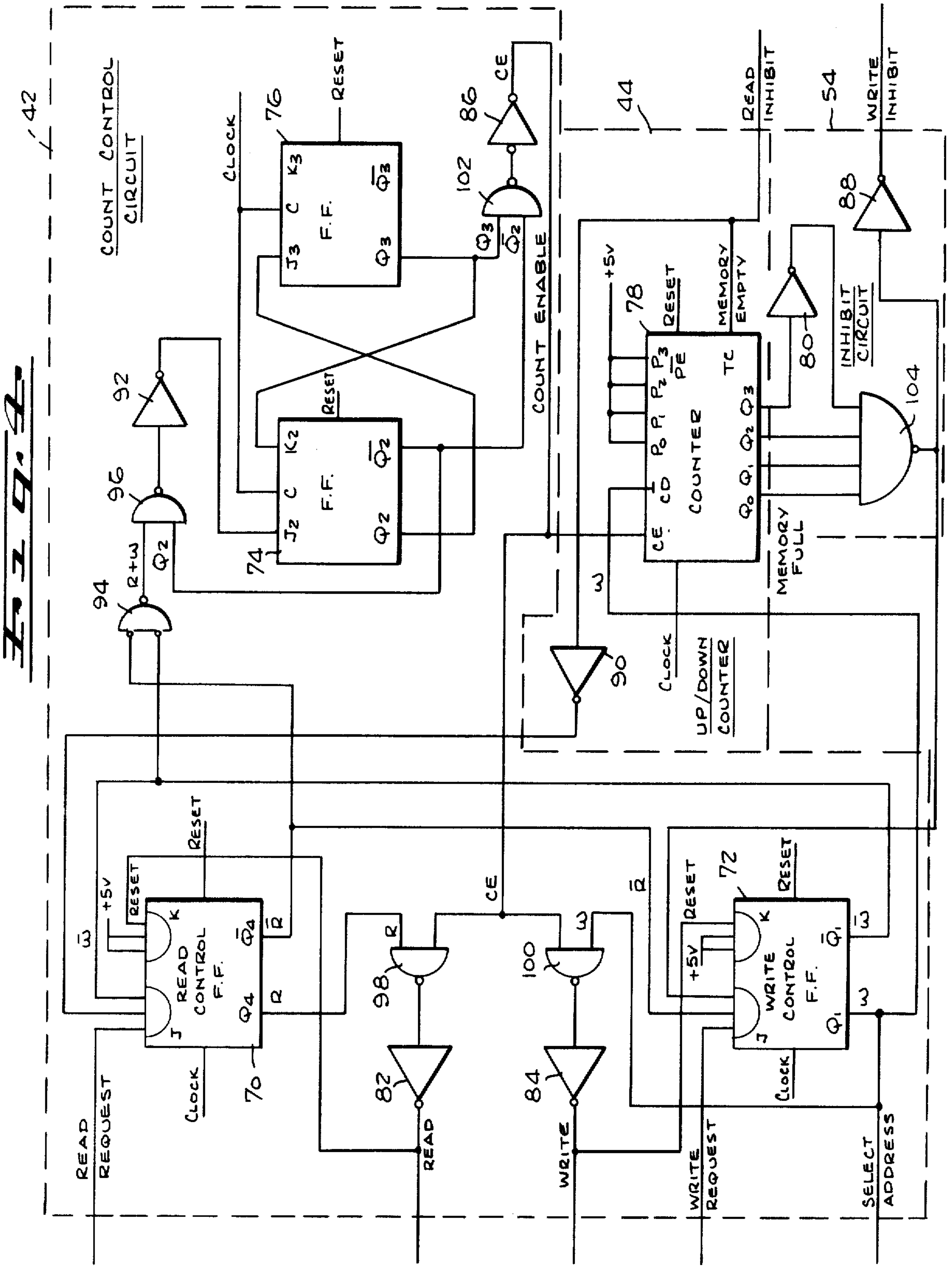
FIG. 4 is a detail logic diagram illustrating an example of circuitry for the embodiment shown in FIG. 2.

The READ signal operates display generator 18 to read data present on its input line 26 from a location in memory 22 determined by the READ ADDRESS. The WRITE signal also changes the count of read counter 30. A detailed circuit for generating WRITE and READ signals is shown in FIG. 4 and discussed below.

Gate 34 also senses the loading of console memory 22 to provide a MEMORY FULL signal on line 48 indicating that memory 22 has been filled to capacity with data messages which have not yet been read and a MEMORY EMPTY signal on line 50 indicating that all of the data messages selected by select logic 16 and stored in console memory 17 have already been read from console memory 17. There are, of course, a number of different ways to implement the MEMORY FULL signal and the MEMORY EMPTY signal. In the embodiment shown in FIG. 2, these functions are implemented by count control circuit 42 and up/down counter 44.

Control circuit 42 is a logic circuit which transmits a COUNT UP signal to up/down counter 44 and a WRITE signal on line 23 to write counter 32 and to memory 22 in response to a WRITE REQUEST signal from select logic 16.

Count control circuit 42 transmits a COUNT DOWN signal to up/down counter 44 and a READ signal on line 52 to read counter 32 and to display generator 18 in response to a READ REQUEST signal from display generator 18. Control circuit 42 may be comprised of conventional logic circuitry known in the art. A SELECT ADDRESS signal transmitted on line 21 to switch 40 determines whether switch 40 transmits on line 46 the write count from counter 32, i.e. the WRITE ADDRESS, or the read count from counter 30 to memory console 22, i.e. the READ ADDRESS.

It is to be understood that up/down counter 44 is implemented to generate output signals indicative of the difference in count between the write counter 32 and the read counter 30. In other words, up/down counter 44 of gate 34 generates a MEMORY EMPTY signal in the form of a predetermined count when the count stored in write counter 32 minus the count stored in the read counter 30 is equal to zero. Up/down counter 44 generates a MEMORY FULL signal when the count stored in write counter 32 minus the count stored in read counter 30 is equal the capacity of the memory 22 (or to the length of a portion of a memory being utilized).

The MEMORY FULL signal is in the form of a predetermined count indicating that all storage locations in the memory are filled with data messages which have not yet been read. The predetermined count of the MEMORY FULL signal need not be equal to the capcity of the memory. Similarly, the predetermined count of the MEMORY EMPTY signal need not be equal to zero. However, the difference between the two predetermined counts is equal to the capacity of the memory being utilized.

Up/down counter 44 may comprise a Signetics Series 8285 counter. For a memory having a capacity of eight words as discussed herein by way of example, one such Series 8285 module would suffice. Up/down counter 44 may have a maximum count equal to the maximum number of words which may be stored in memory 22 and a minimum count equal to zero. Up/down counter 44 is set to an initial count. In the example of FIG. 2, the initial count of up/down counter is 1111 rather than 0000 to simplify the logic.

Although FIG. 2 shows control circuit 42 of gate 34 receiving a WRITE REQUEST signal from select logic 16 and a READ REQUEST signal from display generator 18, it would be equally feasible to direct the WRITE REQUEST signal to increase the count of counter 32 and to direct the READ REQUEST signal to increase the count of counter 30. Gate 34 could then be implemented to determine the difference in count between the write counter and the read counter and for producing the MEMORY EMPTY signal and the MEMORY FULL signal in response to the counts stored in the read and write counters.

Inhibit circuit 54 may comprise conventional logic circuitry for converting the MEMORY FULL signal from up/down counter 44 into a single WRITE INHIBIT signal. Recall that the MEMORY FULL signal is a predetermined output count from up/down counter 44 which indicates that memory 22 is filled to capacity with data messages which have not yet been displayed. Similarly, inhibit circuit 54 may contain logic circuitry for converting the MEMORY EMPTY signal from up/-down counter 44 to a single READ INHIBIT signal. The MEMORY EMPTY signal is a predetermined output count from up/down counter 44 indicating that all the data messages written into memory 22 have been read out. Depending on the initial count selected for up/down counter 44, either the READ INHIBIT signal or the WRITE INHIBIT signal may be obtained directly from up/down counter 44. For example, conventional up/down counters have a terminal count output signal where one logical state indicates that the counter has reached its maximum count. If, for example, the initial count of counter 44 is chosen so that the terminal count is the MEMORY EMPTY signal, then this single logic signal may also be the READ INHIBIT signal.

The WRITE INHIBIT signal is transmitted by a line 56 to computer memory 13 to condition the common computer not to transmit further data messages to console 13 until removal of the WRITE INHIBIT signal. When the next data message is read from console memory 22 and displayed by display generator 18, read counter 30 advances to the next count and capacity control circuit 42 causes up/down counter 44 to reduce its count by 1. Reduction of the count of up/down counter 44 by 1 changes the count from the predetermined count indicating memory 17 is full thus removing the WRITE INHIBIT signal, in other words the writing is enabled.

The READ INHIBIT signal is transmitted by inhibit circuit 54 on line 58 to display generator 18. A READ INHIBIT signal conditions display generator 18 not to read further data messages from memory 17 until removal of the READ INHIBIT signal. The occurrence of the READ INHIBIT signal indicates that all of the data messages stored in memory 22 have been read and presented to display generator 18. Whn the next data message is directed to memory 22 by select logic circuit 16, write counter 32 advances to the next count and control circuit 42 causes up/down counter to increase its count by 1. Increasing the count of the up/down counter by 1 changes the count from the predetermined count which results in a MEMORY EMPTY signal, thus removing the READ INHIBIT signal. In other words, reading is enabled.

A RESET signal on line 60 will reset counters 30, 32 and 44 to their initial count and control circuit 42 to a condition for reading a data message.

FIG. 3 illustrates an example of the operation of the apparatus shown in FIG. 2. Assume, for example, that the rate of reading data messages from memory 22 and displaying data messages by display generator 18 is one-fifth the rate at which data messages are received by select logic circuit 16 from the common computer. Assume also that displays by display generator 18 may occur at times $t_0$, $t_5$, $t_{10}$, $t_{15}$, $t_{20}$ and that data messages may be received at times $t_1$, $t_2$, $t_3$, $t_4$, $t_6$, etc. Reset line 60 has set write counter 30, read counter 32 each to an initial count of zero and up/down counter 44 to an initial predetermined count of 1111. Since no valid data yet exist in console memory 22, it is the function of inhibit circuit 54 to sense the 1111 condition of capacity counter 44 and generate the READ INHIBIT signal on line 58. Assume further that at $t_{-2}$ data messages received by select logic circuit 16 are stored in the first position of memory 22. In response to this writing of a data message, up/down counter increases its count to 0000.

At $t_0$, a READ signal causes the message in position 1 of memory 22 to be read out. Up/down counter changes its count to 1111. The count of 1111 is the predetermined count that produces a MEMORY EMPTY signal indicating that all the data messages heretofore stored in memory 17 have been read out. A READ INHIBIT signal is generated in response to the MEMORY EMPTY signal.

At $t_2$, a second data message is received and is stored in position 2 of the memory in response to a WRITE signal. The writing of a message in position 2 for the memory increases the count of up/down counter from 1111, indicative of a memory empty, to 0000. This change in count removes the READ INHIBIT signal, i.e. it enables writing. At $t_5$, the next time when reading may occur, the data message at position 2 of memory 22 is read out. A $t_7$ and $t_8$, data messages are stored at positions 3 and 4 of memory 17, respectively. At $t_{10}$, the data message at position 3 of memory 22 is read out. At $t_{11}$, $t_{12}$, $t_{13}$ and $t_{14}$, data messages are stored into positions 5, 6, 7 and 8, respectively, of the memory 22. At $t_{15}$, the data message at position 4 of memory 17 is read out.

Recall that memory 22 has a capacity of eight storage locations in the illustrative example.

At $t_{16}$, $t_{17}$, $t_{18}$ and $t_{19}$, data messages are written into positions 1, 2, 3 and 4 of memory 17, thereby erasing previous data messages stored therein.

At $t_{19}$, memory 22 becomes fully loaded with messages stored in memory positions 5, 6, 7, 8, 1, 2, 3 and 4 that have not yet been read. When memory 22 becomes fully loaded, the count of up/down counter 44 is equal to 0111. The count of 0111 produces a MEMORY FULL signal which, in turn, produces a WRITE INHIBIT signal. As a result, inhibit circuit 54 provides a WRITE INHIBIT signal to computer memory 13 to inhibit further data messages from being transmitted to select logic circuit 16 and thus into memory 22.

At $t_{20}$, the data message at position 5 is read and displayed, thereby stepping read counter 30 to the next count. Control circuit 42 decreases the count of up/-down 44 by 1. The count of up/down counter 44 thus changes from 0111 to 0110, thereby removing the WRITE INHIBIT signal. As a result, memory 22 may receive further data messages from computer memory 13.

At times $t_{25}$, $t_{30}$, $t_{35}t_{40}$, $t_{45}$, $t_{50}$, a data message is read from memory positions 6, 7, 8, 1, 2 and 3, respectively. At time $t_{50}$, the count stored in up/down counter 44 has been decreased to 0000. At time $t_{55}$, a data message is read from memory position 4, thereby decreasing the count of counter 44 to 1111 and generating a READ INHIBIT signal.

At time $t_{63}$, a message is written in memory position 5. The count of counter 44 is increased to 0000, thereby enabling reading again. At time $t_{65}$, the data message is read from memory position 5, thereby decreasing the count of counter 44 to the predetermined count of 1111. At the predetermined count, reading is again inhibited.

Thus, it is seen that a number of data messages were written into the memory at the rate received from a digital computer memory, were temporarily stored in a queue in console memory 22 and were read out for display at a much slower rate and in the same order as they were read into the memory.

Buffer memory 22 in each console provides for a queue for data between the computer and console, which queue refreshes the display generator which typically may include cathode ray tube deflection electronics. The data queue permits the deflection electronics to write information on the cathode ray tube at a rate which is significantly lower and independent of the computer output rate. Memory 22 is sized to take advantage of the statistical distribution of the times of arrival of data messages selected for display to optimize the information transfer between the common computer 13 and the individual displays. Prior displays required the ordering of data from the computer file so that no single console receives two or more consecutive tracks of data or that time be allocated for display generation of all messages on all consoles simultaneously. If the message was not intended for a given console, the electron gun of the cathode ray tube was not turned on, blanking out the message. The statistical display buffer, according to the present invention, obviates this requirement and permits the console to receive data messages consecutively without losing data. Statistically, the occurrence of numerous consecutive data messages for a single console would occur very rarely. However, the statistical display buffer, according to the present invention, permits the consecutive reception of data for display.

The size of console memory 22 is determined by statistical analysis and consideration of the worst case display situation. In the event of an overload condition, means (not shown) may be provided to permit the operator to logically examine the selections. For example, certain data messages may be assigned a priority code to enable such messages to be forwarded to an overloaded console for the next immediate display. In addition, indicator means (not shown) may be connected to inhibit circuit 54 to indicate to the operator the overload condition of console memory 22, thereby indicating to the operator that some remedial action should be taken, such as deletion of unneeded track data or selection of a particular region of data to be analyzed.

In FIG. 4, there is shown a detailed logic circuit for the embodiment shown in FIG. 2. The logic circuit of FIG. 4 utilizes well-known circuit element shown with conventional logic symbols. Flip-flops 70 and 72 are J-K flip-flops with AND inputs. Flip-flops 74 and 76 are standard J-K flip-flops. Up/down counter 44 contains a counter 78 of the type previously described and inverter 80. FIG. 4 also includes inverters 82, 84, 86, 88, 90 and 92.

A number of logic gates are also shown. NAND gate 94 is connected as a logic OR gate. Other logic gates include NAND gates 96, 98, 100, 102 and 104. NAND gates shown herein operate according to the following logic. The output of a NAND gate will be a logical 1 if either one or both of the inputs is a logical 0. The output of a NAND gate will be a logical 0 if each input is a logical 1.

The logic circuitry shown in FIG. 4 generates the output signals from gate 34 as shown in FIG. 2.

Figure 5:
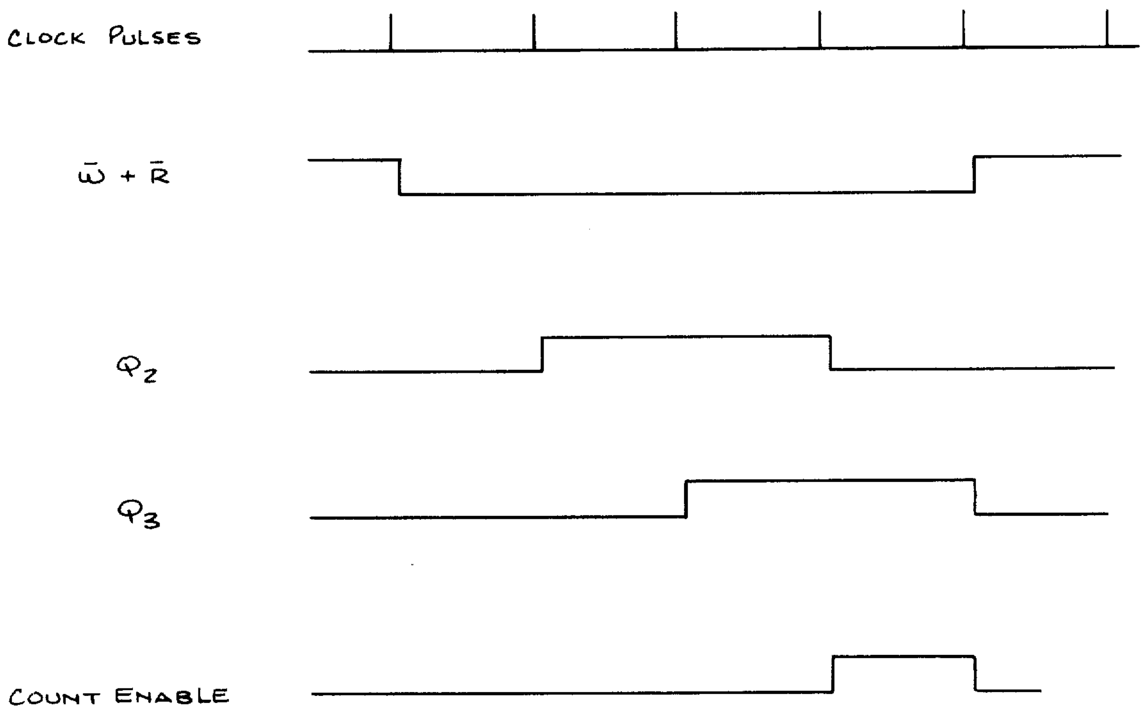
FIG. 5 is a diagram illustrating the relative timing of certain of the signals of the circuitry shown in FIG. 4.

Consider now the operation of the detailed logic circuitry shown in FIG. 4. The following discussion will illustrate as an example of the operation the writing of a data message at $t_{-2}$ and the reading of a data message at $t_{-0}$, as shown in FIG. 3, and discussed above. FIG. 5 shows the relative timing of some of the signals occurring during a writing or a reading operation.

Gate 34 will receive a WRITE REQUEST signal from select logic circuit 16. Flip-flop 72, the write control flip-flop, has previously been reset so that its W output = 0 and the $\overline{W}$ output = 1. The occurrence of the WRITE REQUEST signal will cause flip-flop 72 to set, i.e. the W output will equal 1 and the $\overline{W}$ output will equal 0 if console 15 is not presently reading and if the memory is not full. These conditions are governed by the $\overline{R}$ and MEMORY FULL inputs to the AND gate at the J input of flip-flop 72.

The W output of flip-flop 72 is utilized as the SELECT ADDRESS signal transmitted from control circuit 42 to switch 40 where it determines whether the WRITE ADDRESS or the READ ADDRESS will be transmitted to memory 22. When W = 1, the SELECT ADDRESS signal indicates that the WRITE ADDRESS is transmitted from write counter 32 to memory 22.

NAND gate 94 develops a READ or WRITE signal, R + W. $\overline{W}$ and $\overline{R}$ are the two inputs to NAND gate 94. If either $\overline{R}$ or $\overline{W}$ = 0, then the output of NAND gate 94, R + W will equal 1.

NAND gate 96 prevents the initiation of a read or write operation if either reading or writing is in progress. One input to NAND gate 96 is a signal R + W and the other input is a signal $\overline{Q}_2$. The $\overline{Q}_2$ signal will be a logical 1 if a reading or writing cycle is not in progress. When both inputs to NAND gate 96 are 1, its output will be a 0.

Inverter 92 inverts the 0 output of NAND gate 96 to provide a 1 input signal to the J2 input of flip-flop 74.

In response to a 1 input, flip-flop 74 sets at the next clock time so that its $Q_2$ output is a 1.

The flip-flps are clocked at a rate which is large with respect to the rate of reading or writing.

The $Q_3$ output of flip-flop 76 becomes a 1 at the next clock pulse after $Q_2$ changes to a 1 output in response to the $Q_2$ signal at its $J_3$ input.

At the next clock time $Q_2$ will reset. The $Q_2$ output will equal 0 and $\overline{Q}_2$ will equal 1 because the $Q_3$ output of flip-flop 76 is coupled to the K2 input of flip-flop 74. When $Q_2$ resets, the period during which reading or writing may be initiated comes to an end.

A COUNT ENABLE signal is generated by NAND gate 102 and inverter 86. The COUNT ENABLE signal is 1 when $\overline{Q}_2$ and $Q_3$ are both one. $Q_3$ and $\overline{Q}_2$ are the inputs to NAND gate 102. Inverter 86 inverts the output signals from NAND gate 102 to produce a COUNT ENABLE signal in the high or 1 state.

NAND gate 100 and inverter 84 produce a WRITE signal in response to a COUNT ENABLE input to NAND gate 100 and a W input from write control flip-flop 72.

The WRITE signal from inverter 84 also resets the flip-flop 72, i.e. the W output becomes a 0. This change in state of the W signal causes switch 40 to switch the READ ADDRESS from read counter 30 to memory 22.

The output signal from inverter 84 is the WRITE signal transmitted by control circuit 42 of tate 34 to write counter 32 and to memory 22 in response to the WRITE REQUEST signal from select logic 16. The WRITE signal will cause the data message to be written into position 1 of memory 22 and the write counter 32 to increase its count by 1.

The count of up/down counter 44 is increased from 1111 to 0000 in response to a 1 at its CE input and a 1 at its $\overline{CD}$ input. The count will increase whenever CE $\cdot \overline{CD} \cdot C_p = 1 \cdot C_p$ is the next clock pulse. The W signal is coupled to the $\overline{CD}$ input of counter 78. The counter increases its count in response to a W = 1 and if the other above-stated conditions are true.

The next operation shown on FIG. 3 is the reading of a data message at time $t_2$. Select logic circuit 16 will generate a READ REQUEST signal and transmit it to one of the J input of read control flip-flop 70. The read control flip-flop 70 will then set if writing is not in progress and if no READ INHIBIT signal is present. The conditions for setting are governed by the $\overline{W}$ and READ INHIBIT signals presented to the other inputs to the AND gate at the J input of flip-flop 70. As flip-flop 70 sets, the R output becomes a 1 and the $\overline{R}$ output a 0.

NAND gate 94 has a 1 output either $\overline{R}$ or $\overline{W}$ is a 0 indicating that reading or writing is desired. NAND gate 96 will not prohibit reading since $\overline{Q}_2$ = 1 as discussed above.

From this point, the steps in generating a COUNT ENABLE signal when reading are identical to the steps discussed above for writing.

NAND gate 98 and inverter 82 will produce a READ signal since the R signal and the COUNT ENABLE signal are both 1.

The READ signal will step read counter 30 and direct display generator 18 to read the data message present on its input line. The READ signal at the output of inverter 82 will also reset flip-flp 70 for the next operation.

Counter 78 of up/down counter 44 will count down, i.e. decrease its count from 0000 to 1111, since CE $\cdot$ CD $\cdot C_p = 1$. In other words, the $\overline{CD}$ input to counter 78 is a 0 since the W output of flip-flop 72 if 0.

A READ INHIBIT signal will be generated at time $t_2$ because the one data message stored in memory 22 thus far has been read. When the count of counter 78 decreases to 1111, the terminal count TC output becomes 1. In the embodiment shown in FIG. 2 and FIG. 4, this terminal count signal is the READ INHIBIT signal since 1111 is the predetermined count indicating the memory is empty and reading should be inhibited.

The READ INHIBIT signal is transmitted by inhibit circuit 54 to display generator 18 to prevent reading data messages. In other words, it may prevent display generator 18 from generating additional READ REQUEST signals until the read inhibit has been removed. The READ INHIBIT signal is also inverted by inhibit circuit 54 and applied to one of the inputs of the AND gate at the J input of read control flip-flop 70. A 0 input at this flip-flop will prevent reading in response to a READ REQUEST signal from display generator 18.

When the next message is written into memory 22, of the count of counter 78 increases, the terminal count TC becomes 0 and the READ INHIBIT signal is removed, thus enabling reading.

A WRITE INHIBIT signal occurs at time $t_{19}$, as shown on FIG. 3. At time $t_{18}$, counter 78 has an output count of 0110 at outputs $Q_3\ Q_2\ Q_1\ Q_0$. The writing of a data message in memory position 4 increases the count to 0111. NAND Gate 104 presents a MEMORY FULL signal when $\overline{Q}_3 \cdot Q_2 \cdot Q_1 \cdot Q_0 = 0$. Inverter 88 inverts the MEMORY FULL signal so that the WRITE INHIBIT signal is a 1.

The WRITE INHIBIT signal is removd at time $t_{-20}$ when the next reading of a data message occurs. At time $t_{-20}$, the output count from counter 72 to NAND gate 104 decreases to 0110, thereby enabling writing.

This invention is not to be limited by the embodiment shown in the drawings and described in the description, which is given by way of example and not of limitation, but only in accordance with the scope of the appended claims.

What is claimed is:

1. A memory system comprising:

a. an address memory having a plurality of address regions for data messages, said address memory determining the address region for storing a data message and the address region for read out of a data message;

b. write means for writing data messages into said regions in sequence;

c. selective circuit means in said write means identifying a data message directed to the memory system and generating write request signal for said identified data message, and selectively generating a read request signal;

d. read means for reading data messages from said regions in sequence;

e. display means in said read means displaying data messages read from said memory at a rate independent of the rate at which data messages are written into said memory;

f. first counter means for counting in sequence the number of data messages written into said memory;

g. second counter means for counting in sequence the number of data messages read from said memory;

h. means for storing information indicating the current status of said data messages; and i. circuit means responsive to said current information in said first and second counter means said circuit means including:

1. a switch means selectively switching the count stored in said first and second counter means to said memory;

2. a control circuit means responsive to said write request signal and generating a first control signal
   i. to said switch means to transfer the count of said first counter means and to change the count stored in said first counter means, and
   ii. to said write means to write a data message in said memory, and further responsive to said read request signal and generating a second control signal
   i. to said switch means to transfer the count of said second counter means to said memory and to change the count stored in said second counter means, and
   ii. to said read means to read a data message stored in said memory; and 3. third counter means responsive to said first and second control signals and generating a write inhibit signal when data messages are stored in all of said address regions, and further generating a read inhibit signal when all data messages stored in said address regions have been read;
4. said write means responsive to said write inhibit signal thereupon inhibiting writing of said data messages to said memory, and said read means responsive to said read inhibit signal thereupon inhibiting reading of said data messages from said memory.

2. The system as claimed in claim 1 wherein said memory stores a queue first in first out of data messages as long as the number of data messages written into said memory exceeds the number of data messages read from said memory.

3. The system as claimed in claim 1 wherein said circuit means includes means for selecting the locations of data messages written into said memory by selecting for each data message to be written a location in said memory which corresponds to the count in said first counter means indicating the number of messages written in said memory and wherein a said circuit means further includes means for selecting the locations of data read from said memory by selecting for each data message to be read a location in said memory which corresponds to the count in said second counter means indicating the number of data messages read from said memory.

4. The memory system of claim 1 having a digital computer memory and at least one additional memory system of the type claimed in claim 1, said digital computer memory including means for sensing coded data messages to each of said memory systems, said selective circuit means including circuitry for selectively accepting at least one of said coded data messages.

* * * * *